US005735579A

United States Patent [19]
Wood et al.

[11] Patent Number: 5,735,579
[45] Date of Patent: Apr. 7, 1998

[54] BRAKE ASSURANCE MODULE

[75] Inventors: James A. Wood, Spartanburg; Richard J. Mazur, Greer, both of S.C.

[73] Assignee: Westinghouse Air Brake Company, Wilmerding, Pa.

[21] Appl. No.: 789,919

[22] Filed: Jan. 28, 1997

[51] Int. Cl.$^6$ ............................................. B60T 13/00
[52] U.S. Cl. ........................ 303/7; 303/20; 303/15; 303/128; 303/DIG. 4; 364/426.05
[58] Field of Search ................... 303/3, 7, 15, 20, 303/128, DIG. 4, 122.07, 122.15, 123, 132, 119.1; 364/426.05

[56] References Cited

U.S. PATENT DOCUMENTS

| | | | |
|---|---|---|---|
| 4,410,154 | 10/1983 | Matty | 364/426.05 X |
| 4,830,437 | 5/1989 | Rumsey | 303/15 X |
| 4,835,693 | 5/1989 | Smith et al. | 364/426.05 X |
| 5,222,788 | 6/1993 | Dimsa et al. | 303/15 |
| 5,503,469 | 4/1996 | Cunkel et al. | 303/15 |

*Primary Examiner*—Josie Ballato
*Attorney, Agent, or Firm*—James Ray & Associates

[57] ABSTRACT

A brake assurance module assures braking on at least one truck. It includes a summer, a level circuit, a delay circuit, an emergency driver, a valve driver and a timer circuit. The summer sums friction and dynamic braking signals into a total braking signal. The level circuit generates a threshold signal when the total braking signal exceeds a threshold. The delay circuit generates a level signal after having received the threshold signal throughout a preset time. When the emergency driver receives an emergency signal, it conveys a detect signal. The valve driver controls contacts each in series within a control line used to energize a valve whose operation is normally controlled by the brake control system. The valve driver when activated closes the contacts thereby permitting the system to control the valves. When deactivated, the valve driver opens them thereby preventing the system from controlling the valves. The timer circuit has set, trigger and reset inputs. When the set input receives the level and zero speed signals simultaneously, the timer circuit activates the valve driver thereby placing the module in a standby mode. The timer circuit monitors the trigger input for the detect and full service signals in response to which it becomes enabled. If the reset input receives the level signal within a predetermined time after the timer circuit enables then the timer circuit resets thereby keeping the module in the standby mode. Otherwise, the timer circuit deactivates the valve driver thereby placing the module in an intervention mode.

21 Claims, 7 Drawing Sheets

BRAKE ASSURANCE MODULE

CROSS-REFERENCE TO RELATED APPLICATIONS

This application is related to copending applications Ser. Nos. 08/790,574 and 08/790,575, entitled Universal Pneumatic Brake Control Unit and Brake Pipe Sensing Unit, respectively, have the filing date of Jan. 28, 1997, and Jan. 29, 1997. These patent applications are assigned to the assignee of the present invention, and their teachings are incorporated into the present document by reference.

FIELD OF THE INVENTION

The present invention generally relates to a brake control unit for controlling pressure supplied to the brake cylinders of one or more trucks of a rail vehicle. More particularly, the present invention relates to a brake assurance module for a brake control unit wherein the module in response to a loss of power or to a predetermined set of conditions controls the operation of certain valves through which it provides emergency braking for the truck(s).

BACKGROUND OF THE INVENTION

It is well known in the brake control art that modern train brake control systems typically use a central controller unit to control the brakes of the rail vehicles that comprise the train. A train operator located in the lead locomotive manipulates the brake handles or like devices of the train to apply and release the brakes of the trucks on each rail vehicle as desired. The inputs from the brake handles are typically processed by a cab control unit and passed to the central controller unit. In response to these and other inputs, the central controller unit issues a brake command signal along a trainline to each of the rail vehicles in the form of either a pneumatic signal or an electrical signal or even both. Brake equipment on each of the rail vehicles applies or releases the brakes according to the dictates of the particular brake command signal received.

Depending on the type of train being considered, the brake equipment on each rail vehicle may include either exclusively pneumatic equipment or a combination of electrical and pneumatic (i.e., electropneumatic) equipment. In those trains featuring only pneumatic brake equipment on the rail vehicles, the central controller unit sends the brake command signal along a pneumatic trainline (i.e., pipe) to each of the rail vehicles. The pneumatic brake equipment on each rail vehicle responds pneumatically to apply or release the brakes according to the dictates of the pneumatic brake command signal. In those trains featuring electropneumatic brake equipment on the rail vehicles, each rail vehicle typically includes a master electronic unit (MEU) whose construction and operation are generally well known in the brake control art. The central controller unit sends the brake command signal to each of the rail vehicles along either a pneumatic trainline or an electrical trainline.

The MEU on each rail vehicle receives the brake command signal and various other signals in response to which it directly controls the electropneumatic equipment according to principles well known in the brake control art. Specifically, the MEU directly generates the electrical signals which open or close the various valves which supply pressure to or vent pressure from the brake cylinders. The brakes on each rail vehicle apply and release accordingly.

The MEU, for example, reads the rate request signal, the power/brake signal and the emergency brake signal received from the brake control system. The rate request signal is basically the brake command signal and represents the desired rate at which the brakes of the train are to be applied. Depending on the type of brake control system, the rate request signal may be representative not only of the brake command signal but also the rate at which to propel the rail vehicle during propulsion. As is well known in the brake control art, the power/brake signal is used in conjunction with the rate request signal to distinguish whether the train is in a braking mode or a propulsion mode.

The MEU uses the rate request, the power/brake and the emergency brake signals to determine the rate at which the entire train is to be braked, i.e., train braking rate request in miles per hour per second (mphps). The MEU typically converts this train braking rate request into the rates at which the brakes on its rail vehicle are to be applied, i.e., the railcar braking rate request. The railcar braking rate request (mphps) represents the amount of braking force that should be applied by the brakes of a given rail vehicle.

The MEU may also receive several other signals such as a speed signal, an air spring pressure signal, a dynamic brake feedback signal, a snow brake request signal and a wheel slip control signal. The MEU may use the speed signal to perform speed tapering and jerk limiting. Speed tapering can be employed at speeds above a predetermined level to lower the rate of braking on each rail vehicle. This would decrease the likelihood of wheel slippage and reduce thermal loading on the brakes. This yields a modified railcar braking request. As sudden changes in the speed and motion of a rail vehicle may be undesirable especially in passenger transit applications, the modified truck braking rate request can be adjusted to substantially reduce the amount of jerking that would otherwise be encountered with quick acceleration or braking. The rate at which the railcar brakes are applied or the rate at which the rail vehicle is accelerated may be limited to a preset jerk limit expressed in miles per hour per second per second (mphpsps). This yields a jerk limited railcar braking request.

The air spring pressure signal may be used to estimate the weight of the rail vehicle and modify the jerk limited railcar braking request. This compensates for the weight of the load borne by the rail vehicle during brake applications. Based on rail vehicle weight and the jerk limited railcar braking request, the MEU calculates the required friction tractive effort to be applied by the brakes of each railcar. The wheel slip control signal can be used to reduce the friction tractive effort in response to wheel slippage. The friction tractive effort may be further reduced by the amount of dynamic braking effort provided by the propulsion units.

The MEU may also take into account the snow brake request. This signal represents the small amount of braking force that may be applied to the railcar wheels to prevent build up of ice and/or snow. The MEU may further reduce the friction tractive effort to account for the snow braking effort already applied to the wheels. This yields the final braking effort to be applied to the wheels of each rail vehicle. The final braking effort represents the amount of pressure that ought to be supplied to the brake cylinders of the rail vehicle.

The MEU converts the final friction braking effort into the electrical signals that are used to directly control the electropneumatic equipment according to the aforementioned well known principles. Specifically, it is through these electrical signals that the MEU opens or closes the valves which supply pressure to or vent pressure from the brake cylinders thereby applying or releasing the brakes of all trucks on the rail vehicle.

The prior art brake control systems discussed in the foregoing paragraphs have certain disadvantages when compared to the invention set forth below and related inventions set forth in related applications. The prior art systems typically provide service braking, emergency braking and wheel slip and spin control functions from separate components. This requires a lot of space. Moreover, each component in these prior art systems is typically physically separated from the electronics that controls it. Large amounts of wiring are therefore required to interconnect each component and its controlling electronics. Each rail vehicle, of course, bears the weight of this wiring.

It would therefore be highly desirable to consolidate the service braking, emergency braking and wheel slip and spin control components and their associated electronics within a single, and comparatively small, package. The amount of wiring that would be required to interconnect the various electropneumatic components and their associated electronics in each package would be vastly reduced as compared to the prior art systems. This would reduce the weight that each rail vehicle would be required to bear. The single enclosure for each of the components and their associated electronics would also afford better protection from adverse environmental conditions.

It would be also be highly desirable to design such a package that either by itself or in conjunction with another novel device can be used within and made a part of a variety of train brake control systems such as those used to control passenger trains, subway trains and trolleys. The design of the package would preferably allow it to be substituted not only for the components used to implement service braking and emergency braking in such prior art systems but also, if desired, for the components used to implement wheel slip and spin control.

It would be also be highly desirable to control the brakes at the truck level. In those prior art systems featuring only pneumatic brake equipment on each rail vehicle, the brakes are controlled at the rail vehicle level. Similarly, in those prior art brake control systems featuring electropneumatic brake equipment on each rail vehicle, the MEU is used to control the brakes at the rail vehicle level. By controlling the brakes at each truck individually, this would allow for better overall control of the brakes given the inevitable variations in load weight, motion, wheel slippage and other factors affecting each rail vehicle.

It should be noted that the foregoing background information is provided to assist the reader in understanding the present invention. Accordingly, any terms of art used herein are not intended to be limited to any particular narrow interpretation unless specifically stated otherwise in this document.

SUMMARY OF THE INVENTION

The present invention therefore provides a brake assurance module for use with a brake control system. The brake assurance module assures application of the brakes of at least one truck of a rail vehicle. In a presently preferred embodiment, the brake assurance module includes a summing circuit, a level detector circuit, a delay circuit, an emergency relay driver, a valve relay driver and a timer circuit. The summing circuit receives a signal indicative of friction braking effort via a first feed line and a signal indicative of dynamic braking effort via a second feed line and sums these signals into a total braking effort signal. The level detector circuit generates a threshold signal when the total braking effort signal received from the summing circuit exceeds a predetermined threshold. The delay circuit generates a level signal after having received the threshold signal throughout a preset time period. The emergency relay driver controls a first emergency contact in series within the second feed line. When the emergency relay driver receives an emergency signal from the brake control system, it conveys an emergency detect signal and opens the first emergency contact thereby preventing the dynamic braking effort signal from contributing to the total braking effort signal. The valve relay driver controls a first set of solenoid relay contacts each of which is in series within a control line used to energize a magnet valve whose operation is normally controlled by the brake control system. The valve relay driver when activated closes the solenoid contacts thereby permitting the brake control system to control the magnet valves. When deactivated, the valve relay driver opens the solenoid contacts thereby preventing the brake control system from controlling the magnet valves. The timer circuit has a set input, a trigger input and a reset input. When the set input receives an indication that both the level signal and a zero speed signal occur simultaneously, the timer circuit activates the valve relay driver thereby placing the brake assurance module in a standby mode of operation. During the standby mode, the timer circuit monitors the trigger input for the emergency detect signal and a full service demand signal in response to either or both of which the timer circuit becomes enabled. If the reset input receives the level signal within a predetermined time after the timer circuit has become enabled then the timer circuit resets thereby keeping the brake assurance module in the standby mode. Otherwise, the timer circuit deactivates the valve relay driver thereby placing the brake assurance module in an intervention mode of operation.

OBJECTS OF THE INVENTION

It is, therefore, a primary object of the present invention to provide a brake assurance module for use with a brake control system for assuring application of the brakes of one or more trucks of a rail vehicle.

Another object of the present invention is to provide a brake assurance module for use with a brake control system wherein the module in response to a loss of power or to a predetermined set of conditions interrupts the control that other parts of the brake control system otherwise have over certain valves thereby assuring deenergization of those valves and application of the brakes of one or more trucks of a rail vehicle.

In addition to the objects and advantages listed above, various other objects and advantages of the present invention will become more readily apparent to persons skilled in the relevant art from a reading of the detailed description section of this document. Such other objects and advantages will become particularly apparent when the detailed description is considered along with the attached drawings and with the appended claims.

DETAILED DESCRIPTION OF THE INVENTION

Figure 1:
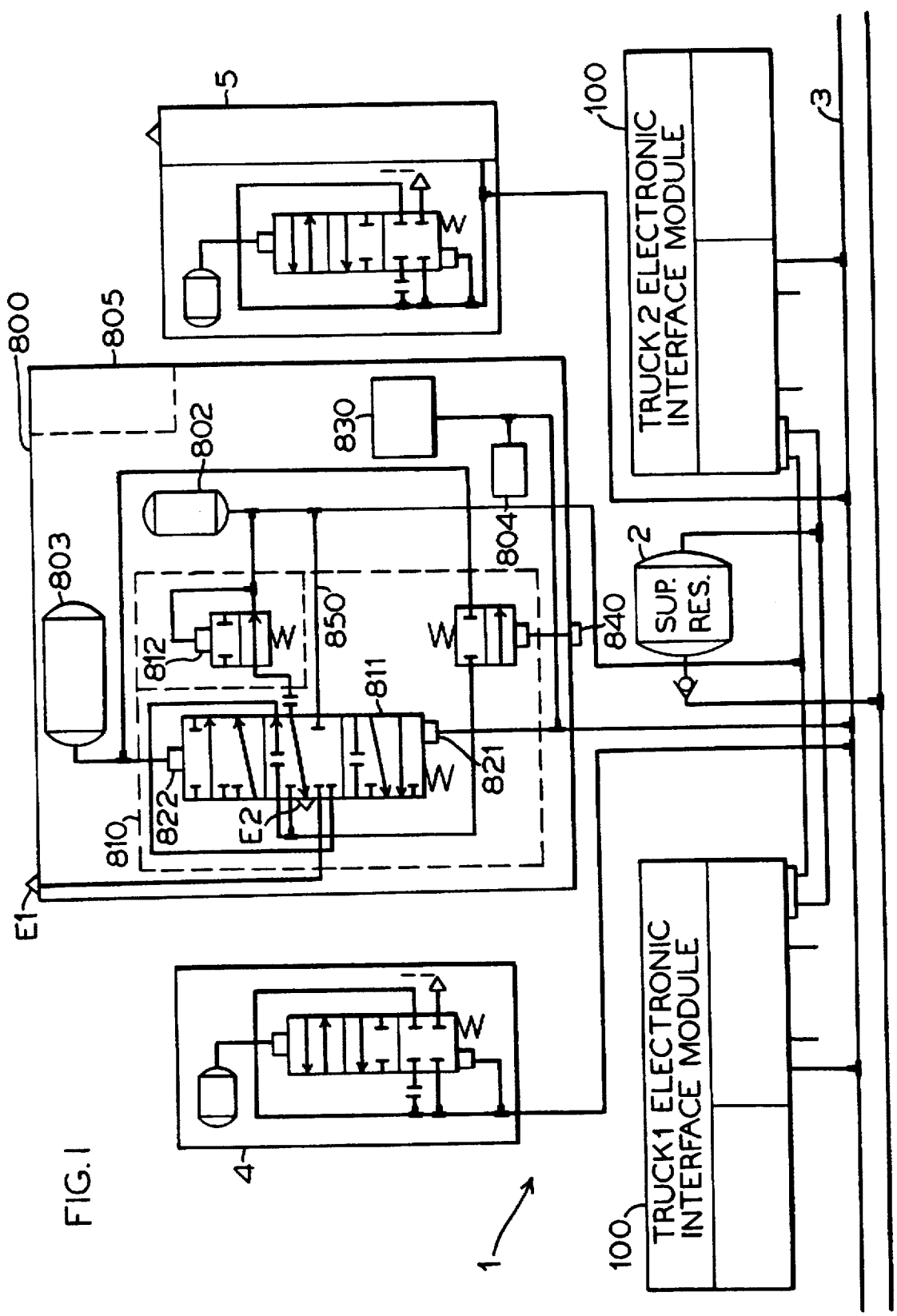
FIG. 1 is a partial schematic view of a brake control system in which the present invention has been incorporated.

Before describing the present invention in detail, the reader is advised that, for the sake of clarity and understanding, identical components having identical functions in each of the accompanying drawings have been marked with the same reference numerals in each of the Figures provided in this document.

The brake assurance module can be used within and made a part of a variety of train brake control systems. The present invention, for example, may be incorporated into pneumatic brake control systems such as the WABCO 26-C Brake Control System, the WABCO RT-2 Brake Control System and the WABCO RT-5 Brake Control System (T-1 Style, MARTA Style and WMATA Style). Depending on the particular brake control system in which the present invention is used, certain modifications that should be apparent to persons skilled in the brake control art may be necessary. Any of the brake control systems featuring the present invention will more reliably control the brakes of the train as compared to such brake control systems lacking the present invention.

FIG. 1, for example, illustrates generally the present invention in its presently preferred embodiment. This figure generally depicts the present invention within the WABCO 26-C Brake Control System, generally designated 1, to control the brakes of a train. The brake control system includes a universal pneumatic brake control unit 100 through which to control the brakes on one or more trucks of a given rail vehicle. For reasons that will become more apparent from a reading of the ensuing paragraphs, one universal unit is preferably used for each truck.

Figure 2:
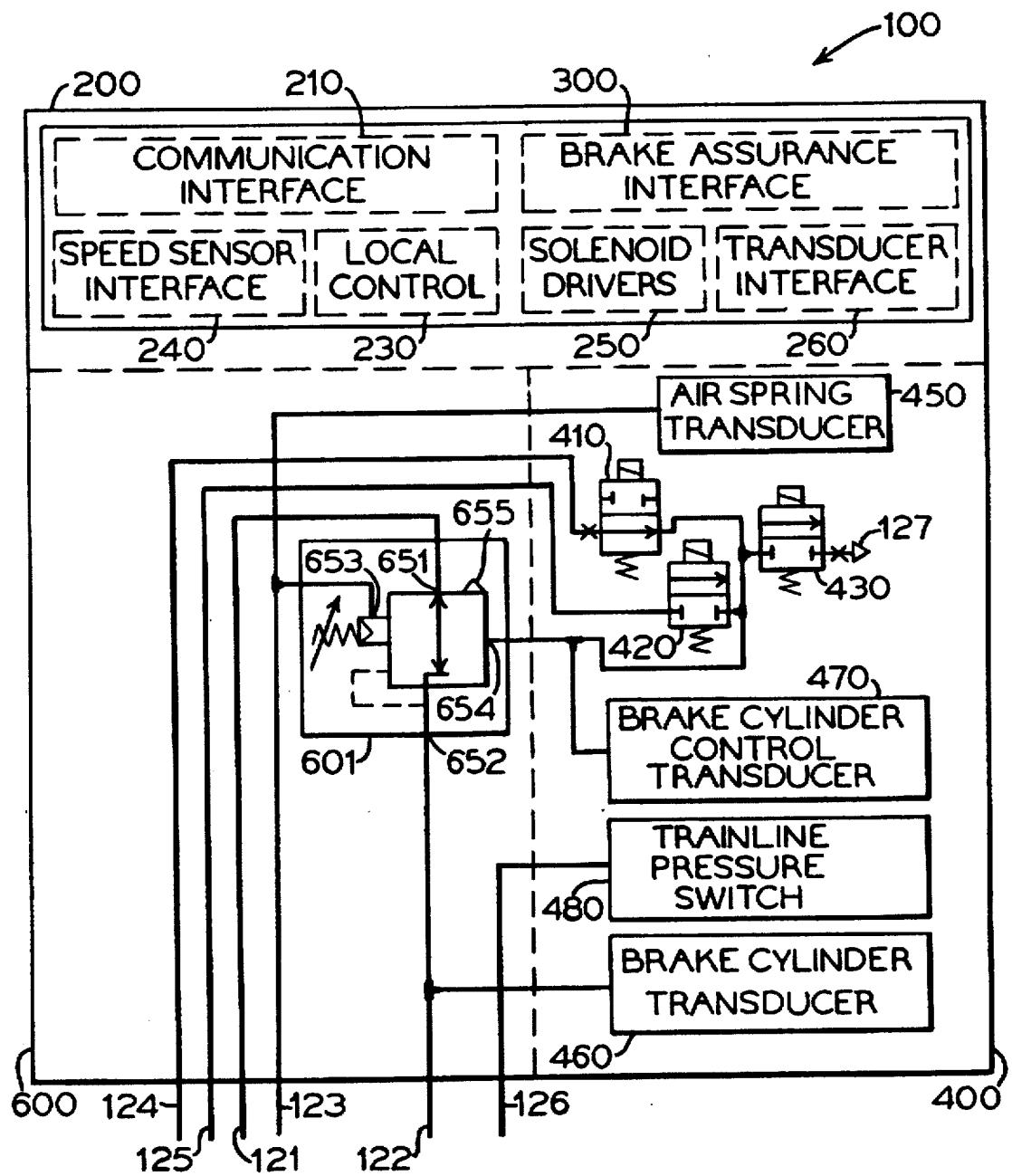
FIG. 2 is a block diagram of the universal brake control unit shown in FIG. 1 incorporating the brake assurance module of the present invention.
Figure 3:
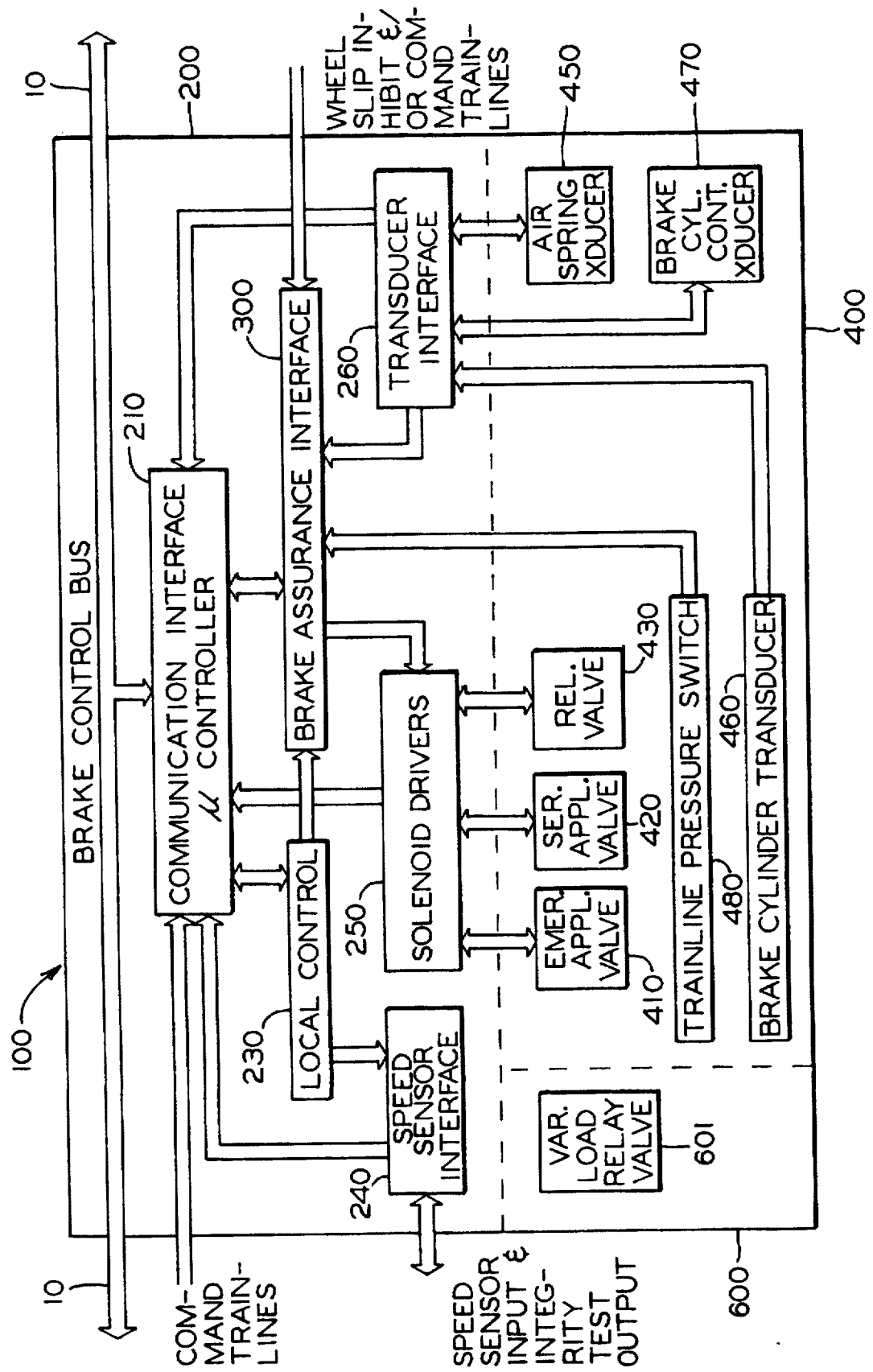
FIG. 3 is a block diagram illustrating how the brake assurance module connects within the universal brake control unit shown in FIGS. 1 and 2.

Referring now to FIGS. 2 and 3, the universal unit basically comprises an electronics section 200, an electropneumatic section 400 and a pneumatic section 600. The electronic section 200 includes a communication interface means 210, a local control means 230, a speed sensor interface means 240, a solenoid driver means 250, a transducer interface means 260 and the brake assurance module 300. The electropneumatic section 400 includes an emergency application valve (EAV) 410, a service application valve (SAV) 420 and a release valve (RV) 430 along with an air spring transducer (AST) 450, a brake cylinder transducer (BCT) 460, a brake cylinder control transducer (BCCT) 470 and a trainline pressure switch 480. The pneumatic section 600 features a variable load relay valve (VLRV) 601.

The universal unit 100 connects pneumatically within the 26-C Brake Control System 1 through several ports as shown in FIGS. 1 and 2. The input ports of universal unit 100 include a relay valve supply port 121, an air spring supply port 123, an emergency application supply port 124, a service application supply port 125 and a trainline pipe port 126. The output ports include a brake cylinder output port 122 and an exhaust port 127. The air spring supply port 123 receives air spring pressure from an air suspension system (not shown) on the rail vehicle in a manner well known in the brake control art. The service application supply port 125 receives a first source of pressure. The emergency application supply port 124 receives a second source of pressure and the relay valve supply port 121 receives a third source of pressure. In the 26-C System, the first and third sources of pressure are preferably the same, namely, the supply reservoir 2 of brake control system 1. The second source of pressure is a brake pipe 3 via a BP sensing unit 800. Also, the trainline pipe port 126 receives pressure from the brake pipe in the 26-C System. The trainline or brake pipe pressure switch (BPPS) 480 then monitors the pressure in the brake pipe 3. In a manner well known in the brake control art, when pressure in brake pipe 3 drops to an emergency level, the BPPS 480 generates an electrical signal indicative of an emergency. The BPPS passes this emergency signal to the brake assurance module 300 where it is used in an emergency as described below.

The variable load relay valve 601 is an air piloted device whose construction and operation are well known in the brake control art. The VLRV 601 may optionally be replaced by a combination consisting of a variable load valve and a J-1 relay valve both of which are also well known. The VLRV 601 includes a supply port 651 connected to the third source of pressure via relay valve supply port 121, an output port 652 connected to the brake cylinders via brake cylinder output port 122, and a load weight port 653 connected to the air suspension system via air spring supply port 123 and a brake control port 654 connected both to the outputs of the EAV 410 and SAV 420 and to the input of the RV 430. The VLRV 601 also includes an exhaust port 655 through which pressure from the brake cylinders vents to atmosphere when the pressure at brake control port 654 falls below a minimal level in a manner well known in the art. The SAV 420 when open allows a low capacity service brake control pressure to pass from the first source of pressure to brake control port 654. The EAV 410 when open allows a low capacity emergency brake control pressure to pass from the second source of pressure to brake control port 654. The VLRV 601 responds to either low capacity brake control pressure by providing from output port 652 a high capacity pressure to the brake cylinders. Though the air supplied to the brake cylinders will obviously be provided in greater quantity than the air received at brake control port 654, the air delivered to the brake cylinders (i.e., brake cylinder pressure) and the air delivered to brake control port 654 (i.e., brake control pressures) will be approximately equal in pressure as long as the brake cylinder pressure is below the air spring pressure provided to load weight port 653. Brake cylinder pressure is thus proportional to pressure that the VLRV 601 receives from the air suspension system. The VLRV 601 uses air spring pressure to limit the maximum pressure at which air is directed to the brake cylinders. The VLRV 601 thus compensates for the weight of the load borne by the rail vehicle during both service and emergency brake applications.

Regarding the pressure transducers, the air spring transducer (AST) 450 monitors the air spring pressure at the load weight port 653 of the VLRV 601. The brake cylinder control transducer (BCCT) 470 monitors the brake control pressure at the brake control port 654 of the VLRV. The brake cylinder transducer (BCT) 460 monitors the pressure supplied to the brake cylinders from the output port 652 of the VLRV (i.e., the brake cylinder output port 22 of the universal unit).

The SAV, EAV and RV valves are each two-way magnet valves controlled by the electronic section 200 of universal unit 100 as indicated by FIGS. 2 and 3. The SAV 420 connects at its input port to the first source of pressure via the service application supply port 125 and at its output port connects to the brake control port 654 of the VLRV 601. The EAV 410 connects at its input port to the second source of pressure via the emergency application supply port 124 and at its output port to the brake control port 654 of the VLRV. The RV 430 connects at its input port to brake control port 654 and vents to atmosphere through its exhaust port 127.

The universal unit 100 connects electrically within the 26-C Brake Control System 1 as best shown in FIG. 3. Each rail vehicle usually includes a master electronic unit (MEU) (not shown) whose construction and operation are generally well known in the brake control art. The communication interface means 210 is the component through which universal unit 100 communicates with the MEU via a brake control bus 10 on the rail vehicle. The communication means 210 may take the form of any one of a variety of known devices used to communicate information between parts of an electronic system. Through brake control bus 10, the MEU communicates with and controls each of the universal units 100 on a given rail vehicle as explained below. Brake control bus 10 can be either an electronic or a fiber optic link and use any one of a variety of communication protocols known in the communication art.

The universal unit 100 incorporates into the WABCO 26-C Brake Control System 1 along with the BP sensing unit 800 as shown in FIG. 1. BP sensing unit 800 is a novel device which serves at least in part as a pneumatic backup to the universal unit 100 on each of the trucks. BP sensing unit 800 pneumatically interconnects between the brake pipe 3 of brake control system 1 and emergency application supply port 124 of each universal unit 100 on the rail vehicle. As shown in FIG. 1, BP sensing unit 800 connects to brake pipe 3 much like the prior art VX vent valve 4 and the prior art A-1 reducing relay valve 5 typically found on many brake control systems. BP sensing unit 800 electrically connects within brake control system 1 through its BP transmission interface means 805. BP transmission means 805 may take the form of any one of a variety of known devices used to communicate information between parts of an electronic system. The transmission means connects BP sensing unit 800 to the MEU via brake control bus 10.

The BP sensing unit 800 includes an auxiliary reservoir 802, a control reservoir 803, a brake pipe transducer (BPT) 804, the transmission interface means 805 and an MC-31 control valve portion 810. The MC-31 valve portion 810 includes a three state valve 811, a quick service valve (QSV) 812 and, optionally, a quick release valve (QRV) 813. The three state valve 811 is an air piloted valve whose construction and operation are generally well known in the brake control art. The three state valve includes two pilot ports and two exhaust ports E1 and E2. Its operation depends on the difference in pressure applied to its two pilot ports. As shown in FIG. E, the first pilot port 821 receives pressure from brake pipe 3 while the second pilot port 822 receives pressure from control reservoir 803. The QSV 812 is an air piloted valve whose operation depends on the pressure applied to its service pilot port. The service pilot port pneumatically connects to the emergency application supply port 124 (i.e., the input of EAV 410) in each universal unit 100 on the rail vehicle. The QSV 812 remains in an open state as long as pressure at its pilot port remains below a preselected level as alluded to in FIG. 1. The QRV 813 is an optional feature of BP sensing unit 800. It is also an air piloted valve whose operation depends on the pressure applied to its release pilot port. The release pilot port pneumatically connects to port 840 of BP sensing unit 800. The QRV 813 remains in a closed state until the pressure at port 840 builds to the preselected or any other desired level. The auxiliary reservoir 802 also pneumatically connects to the emergency application supply ports 124. It essentially serves as a buffer against sharp increases and decreases in pressure.

The BP sensing unit 800 operates in response to the changes in pressure within the brake pipe 3 of the brake control system. Depending on the difference in pressure between the first and second pilot ports 821 and 822 of three state valve 811, the three state valve may assume any one of three positions: apply, lap and release. When the 26-C System, for example, commands a decrease in brake pipe pressure to apply the brakes, the three state valve will soon move to the apply position. This occurs when the pressure in brake pipe 3 falls below that in the control reservoir 803 thereby dropping the pressure at first pilot port 821 relative to that at second pilot port 822. The three state valve then assumes the apply position in which pressurized air flows both to auxiliary reservoir 802 and to emergency application supply port 124 24 of each universal unit (i.e., to the input of the EAVs). This pressurized air flows to those two destinations through two routes in BP sensing unit 800: (1) from control reservoir 803 through three state valve 811 and pipe 850 to the EAVs and (2) from brake pipe 3 through three state valve 811 and the QSV 812 to the EAVs as long as the pressure at the pilot port of QSV 812 remains below the preselected level. The QSV advantageously diverts from brake pipe 3 to the EAVs a relatively small amount of pressurized air that otherwise would be exhausted to atmosphere. When the pressure at service pilot port of QSV 812 exceeds the preselected level, the QSV closes thereby severing one connection between brake pipe 3 and emergency application supply ports 124. Once the QSV closes, the QSV prevents the pressurized air supplied to the EAVs from flowing back into brake pipe 3. During brake applications, the QSV thus assists not only in quickly reducing pressure in brake pipe 3 but also in quickly increasing the pressure supplied to the emergency application supply port 124 of each universal unit.

When the 26-C System, for example, commands an increase in brake pipe pressure to release the brakes, three state valve 811 will soon move to the release position. This occurs when the pressure in brake pipe 3 exceeds the pressure in control reservoir 803 thereby increasing the pressure at first pilot port 821 relative to that at second pilot port 822. The three state valve then assumes the release position in which pressurized air from brake pipe 3 flows through three state valve 811 to pressurize control reservoir 803. Simultaneously, BP sensing unit 800 vents to atmosphere pressurized air from both auxiliary reservoir 802 and the emergency application supply port 124 of each universal unit. It vents such pressurized air from those two sources to atmosphere through two routes in BP sensing unit 800: (1) from the EAVs through pipe 850 and three state valve 811 to atmosphere via exhaust port E1 and (2) from the EAVs through QSV 812 and three state valve 811 to atmosphere via exhaust port E2. The latter route is available only when the pressure at the pilot port of QSV 812 again drops below the preselected level.

The optional QRV 813 may be used to pressurize the brake pipe even more quickly when the 26-C System 1 commands an increase in brake pipe pressure to release the brakes. Specifically, as brake pipe 3 begins to charge, the QRV 813 may be used to provide a route through which pressurized air remaining in control reservoir 803 can flow back into brake pipe 3. During brake pipe charging, the release pilot port of QRV 813 need only receive a pressure sufficient to open the QRV. Once open, the QRV would allow the pressurized air to flow from control reservoir 803 through pipe 850 back into brake pipe 3 as shown in FIG. 1. Functioning in a manner similar to that of QSV 812, the QRV 813 may be used to assist in quickly recharging the brake pipe and releasing the brakes.

When the control reservoir eventually reaches an equilibrium with the brake pipe, the pressures respectively applied to the first and second ports 821 and 822 of three state valve 811 equalize. The three state valve then assumes the lap position in which the pressurized air from brake pipe 3 flows through a choke in three state valve 811 to keep control reservoir 803 pressurized. The three state valve thus maintains within control reservoir 803 the pressure that will be needed to pneumatically instigate the next brake application via the universal units. Simultaneously, BP sensing unit 800 still vents to atmosphere pressurized air from both auxiliary reservoir 802 and the emergency application supply port 124 of each universal unit. As shown in FIG. 1, however, it vents such pressurized air from those two sources to atmosphere only through one route in the BP sensing unit: from the EAVs through QSV 812 and three state valve 811 to atmosphere via exhaust port E2. As long as the pressure at its pilot port remains below the preselected level, the QSV remains open and allows such pressurized air to vent to atmosphere.

The BP sensing unit may also feature a CS magnet valve 830. The CS magnet valve 830 is a valve whose construction and operation are generally well known in the brake control art. It may or may not be incorporated into the BP sensing unit depending into which particular brake control system the invention will be incorporated. In the WABCO 26-C CS-2 Style Brake Control System, for example, BP sensing unit 800 may feature CS magnet valve 830 as shown in FIG. 1. The CS magnet valve could be used to vent brake pipe 3 to atmosphere when energized via an electrical trainline. When the brake control system 1 commands a decrease in brake pipe pressure to apply the brakes, for example, it could also energize CS magnet valve 830 so that brake pipe pressure would drop even more quickly. CS magnet valve 830 can therefore be used to assist in quickly decreasing pressure in brake pipe 3 and applying the brakes.

It should be apparent to persons skilled in the brake control art that the BP sensing unit may conceivably be employed on brake control systems other than the 26-C discussed above. Obvious modifications may be necessary, though, such as changing the pneumatic trainline to which the sensing unit would connect. This would, of course, depend upon the specific application in which the sensing unit is employed.

Regarding the operation of the present invention, the WABCO 26-C Brake Control System through its central controller unit (not shown) sends the brake command signal pneumatically along brake pipe 3 to each of the rail vehicles. It is through this brake command signal that the train operator ultimately controls the brakes of the rail vehicles in the train. The brake pipe transducer (BPT) 804 of BP sensing unit 800 on each rail vehicle converts the pneumatic brake command signal into an electrical signal which it passes to the BP interface means 805. Through BP transmission means 805, BP sensing unit 800 makes this electrical brake command signal available to the MEU or any other devices on brake control bus 10. The MEU receives not only the brake command signal but also other signals through which it controls each of the trucks on the rail vehicle.

Figure 4A:
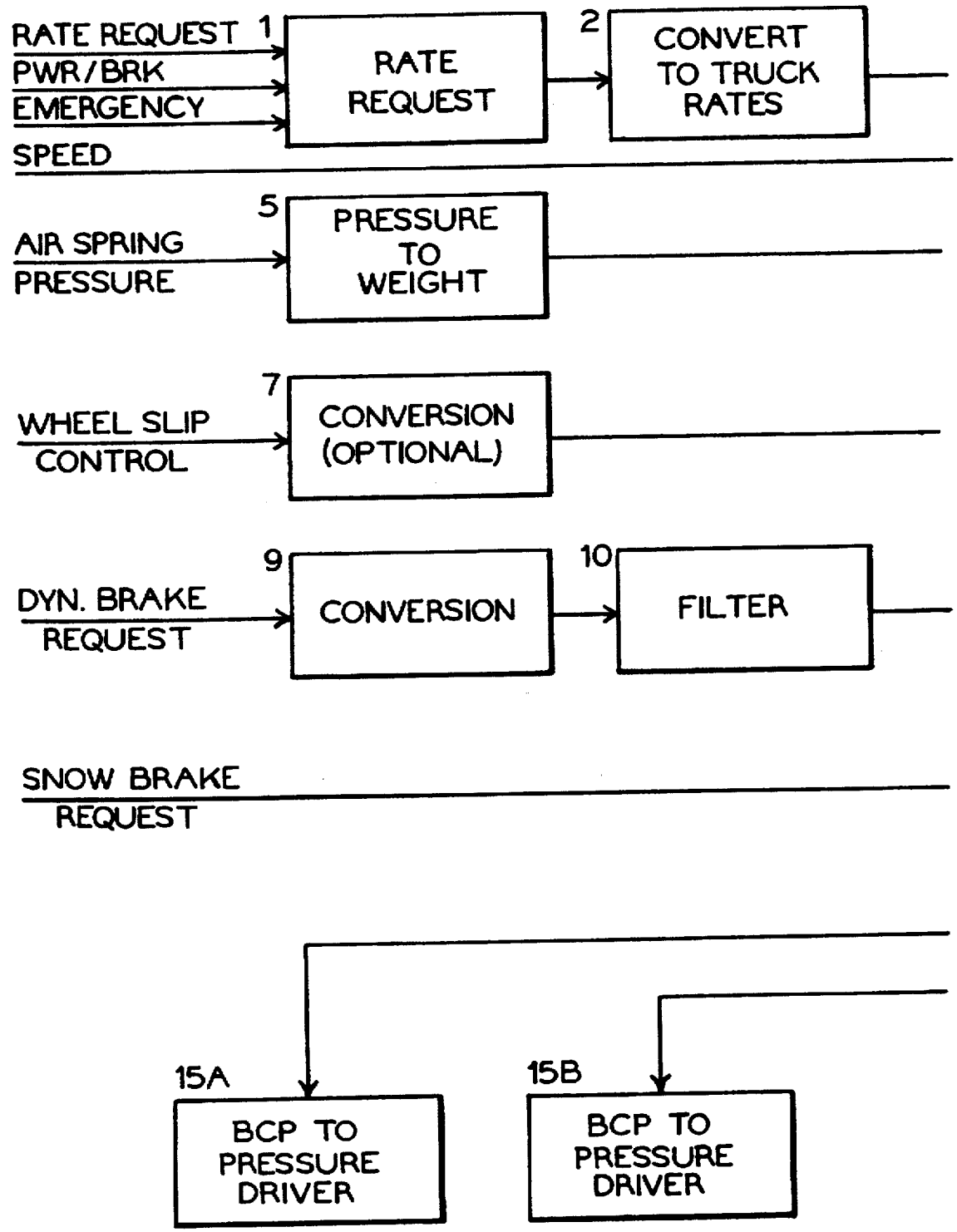
FIG. 4 is a block diagram that illustrates a brake control process.
Figure 4B:
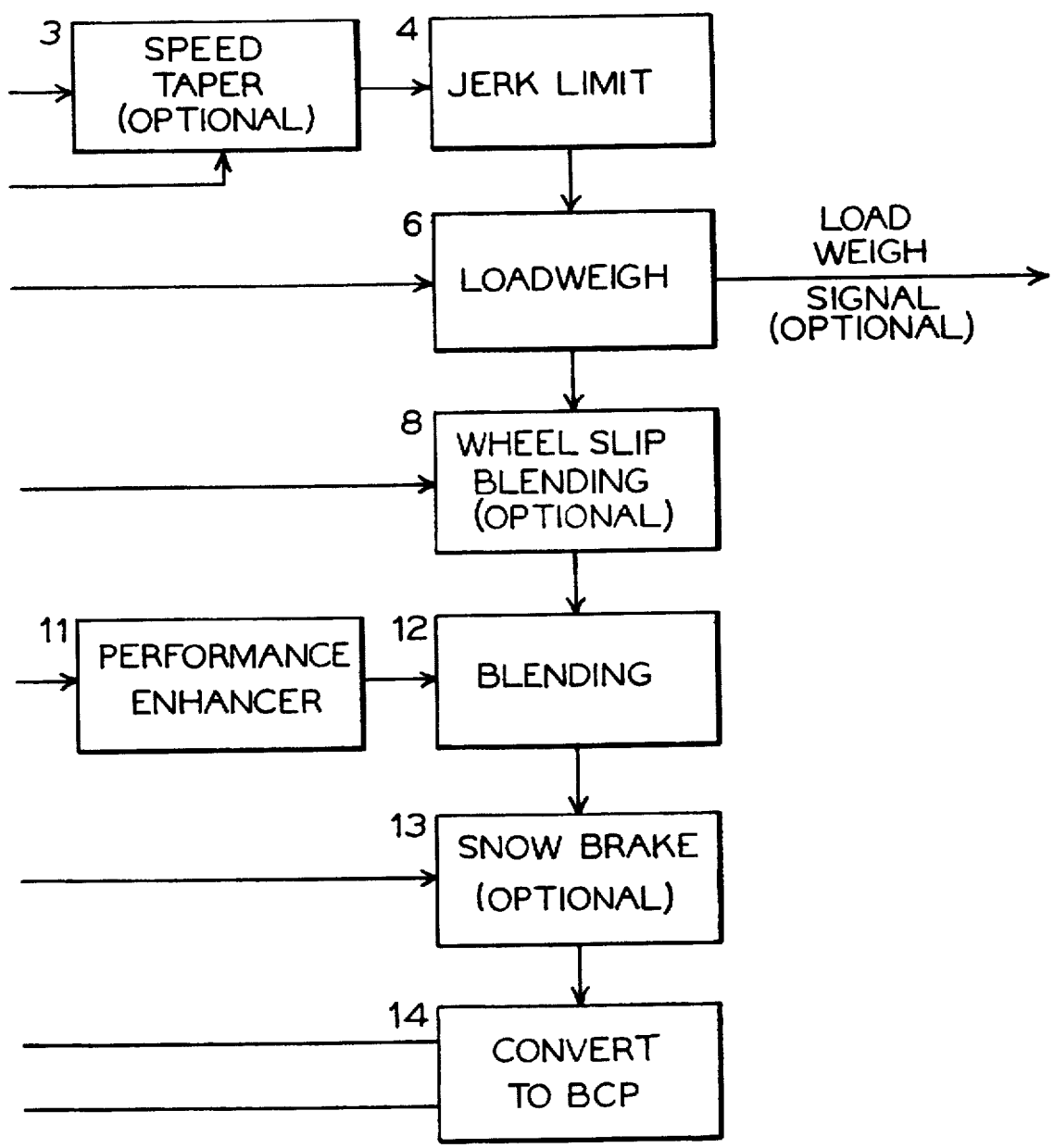

The MEU in each rail vehicle performs the Brake Control Process depicted in blocks 1–15 of FIG. 4. This process is somewhat different than the prior art brake control process described above especially as it pertains to the functions illustrated in blocks 15A and 15B. As shown in FIG. 4, the MEU receives various signals and determines a brake force command signal according to principles well known in the brake control art. The brake force command signal is an electrical signal ultimately indicative of the pressure that ought to be supplied to the brake cylinders of each truck. It is communicated to each universal unit as indicated in blocks 15A and 15B.

The MEU, for example, reads the rate request signal, the power/brake signal and the emergency brake signal received from the brake control system as shown in block 1. In certain brake control systems such as the 26-C System, the rate request signal and the emergency brake signal are both conveyed to the MEU through the same route, i.e., along brake pipe 3 to BPT 804 to the MEU, and are essentially one and the same. In other brake control systems, they may be conveyed to the MEU through different routes such as separate electrical and pneumatic trainlines. Depending on the type of brake control system in which the present invention is employed, the rate request signal may be representative not only of the brake command signal but also the rate at which to propel the rail vehicle during propulsion. In the 26-C System, however, the rate request signal represents the brake command signal. The power/brake signal is used in conjunction with the rate request signal to distinguish whether the train is in the braking mode or the propulsion mode.

Block 1 of the Brake Control Process illustrates that the MEU uses these signals to determine the rate at which the entire train is to be braked, i.e., train braking rate request (in mphps). Block 2 illustrates that the MEU converts the train braking rate request into the rates at which the trucks on the rail vehicle are to be braked, i.e., the truck braking rate request (in mphps). The truck braking rate request represents the amount of braking force that should be applied by the brakes of each truck.

The MEU may also process other signals such as a speed signal, an air spring pressure signal, a dynamic brake feedback signal, a snow brake request signal and a wheel slip control signal. Block 3 of the Brake Control Process illustrates that the MEU may use the speed signal to perform speed tapering, an optional feature of the Brake Control Process. The output of block 3 is a modified truck braking request. Block 4 represents jerk limiting through which to reduce the jerking that would otherwise be encountered with quick acceleration or braking. The rate at which the truck brakes are applied or the rate at which the rail vehicle is accelerated may be limited to the preset jerk limit (mphpsps). The jerk limited truck braking request passes to block 6.

Blocks 5 and 6 of the Brake Control Process show that the air spring pressure signal may be used to modify the jerk limited truck braking request so as to compensate for the weight borne by the rail vehicle during brake applications. Based on rail vehicle weight and the jerk limited truck braking request, the MEU calculates the required friction tractive effort to be applied by the brakes of each truck as indicated by block 6. Block 7 and 8 show that the wheel slip control can be used to reduce the friction tractive effort in response to wheel slippage. Blocks 9–12 show that the friction tractive effort may be further reduced by the amount of dynamic braking effort provided by the propulsion units.

Block 13 illustrates that MEU may also take into account the snow brake request. The friction tractive effort may be further reduced to account for the snow braking effort already applied to the wheels. The output of block 13 represents the final braking effort to be applied to the wheels of each truck. Block 14 illustrates that the MEU converts the final friction braking effort into an electrical signal indicative of brake cylinder pressure. Equivalent to the final braking effort, the brake cylinder pressure signal represents the amount of pressure that ought to be supplied to the brake cylinders of each truck of the rail vehicle. Blocks 15A and 15B each convert the brake cylinder pressure signal into the type of voltage or current signal that can be processed by each of the universal units 100 on the rail vehicle. This signal, called the brake force command signal, is sent to each universal unit 100 as shown in blocks 15A and 15B.

It should be apparent to persons skilled in the brake control art that each universal unit 100 could be designed to perform part or all of the Brake Control Process in addition to those tasks described below. The various signals needed to perform the process would be conveyed directly or indirectly to universal unit 100 via the trainlines or other means as shown in FIG. 3. The MEU could then serve as a backup or perform more of a communication function or other desired tasks or both. Obvious modifications may be necessary, though, depending upon the specific application in which the universal unit is employed.

Referring now to FIGS. 2 and 3, the MEU sends the brake force command signal to the communication interface means 210 of each universal unit on the rail vehicle. Communication means 210 conveys the brake force command signal to local control means 230. Local control means 230 is basically a computing device through which universal unit 100 controls its magnet valves (i.e., the RV, SAV and EAV) during most conditions as explained below. Specifically, in response to the brake force command signal, local control means 230 generates valve command signal(s) to direct solenoid driver means 250 to energize the appropriate magnet valve(s). For reasons that will soon be apparent the valve commands sent from local control means 230 to solenoid driver means 250 are routed through brake assurance module 300.

The brake force command signal can also be referred to as a command for brake control pressure because it represents the pressure that should be supplied to the brake control port 654 of VLRV 601. The brake force command signal, of course, is also ultimately indicative of the pressure that should be supplied to the brake cylinders of each truck. Local control means 230 receives not only the command for brake control pressure but also feedback in the form of a brake control pressure feedback signal. The brake control pressure feedback signal is indicative of the pressure currently at brake control port 654 of VLRV 601. It is sent from the BCCT 470 via transducer interface means 260 and communication interface means 210.

The local control means essentially controls the pressure that is applied to brake control port 654 of the VLRV. Local control means 230 executes a summing point function through which it compares the command for brake control pressure received ultimately from the MEU with the brake control pressure feedback signal received ultimately from BCCT 470. If the brake control pressure feedback signal represents a pressure greater than that represented by the command for brake control pressure, local control means 230 will command solenoid driver means 250 to energize (open) RV 430 either continuously or pulsingly to reduce the pressure at brake control port 654 of the VLRV to the desired level. Local control means 230 will also simultaneously command solenoid driver means 250 to direct SAV 420 to its normally closed (deenergized) state and EAV 410 remains in its closed (energized) state. This prevents service brake control pressure or emergency brake control pressure from affecting the pressure at brake control port 654 of the VLRV. If the brake control pressure feedback signal represents a pressure whose value lies within a preset band around that represented by the command for brake control pressure, local control means 230 will command solenoid driver means 250 to maintain the pressure currently prevailing at brake control port 654 of the VLRV. Solenoid driver means 250 will thus direct the SAV and RV to their closed (deenergized) states and the EAV remains in its closed (energized) state. The pressure at brake control port 654 thus remains constant. If the brake control pressure feedback signal represents a pressure less than that represented by the command for brake control pressure, the local control means will command the solenoid driver means to energize (open) the SAV either continuously or pulsingly to increase the pressure at brake control port 654. Local control means 230 will also simultaneously command the solenoid driver means to direct the RV to its normally closed (deenergized) state and the EAV remains in its closed (energized) state. This allows service brake control pressure to build at control port 654 of the variable load relay valve 601.

The VLRV responds to either brake control pressure by providing a corresponding pressure to the brake cylinders that is proportional to pressure that VLRV 601 receives from the air suspension system. This yields a final friction braking effort to the wheels of the truck that compensates for the weight of the load borne by the rail vehicle. Local control means 230 responds in this manner continuously to both the command for brake control pressure and the brake control pressure feedback signal as these commands are obviously subject to continuous change.

It should be apparent that universal unit 100 may optionally use a J-1 relay valve instead of variable load relay valve 601 depending on the particular train at issue. Certain 26-C Systems, for example, do not require the VLRV even though each of the rail vehicles of the train has an air suspension system. This is because the difference between the weight of the railcar and that of the load may be insufficient to warrant the addition of the load compensating function of the VLRV. The J-1 relay valve would be incorporated into the universal unit in a manner identical to the VLRV with the exception of load weight port 653.

The local control means may also perform certain other tasks which can be performed according to principles well known in the brake control art. For example, local control means 230 can be used to determine whether the speed sensors are operating properly. This includes determining whether any discontinuities have developed in the associated wiring. It does this through a speed sensor test signal which it sends via the speed sensor interface means 240 to each speed sensor located on the axles of the truck. The result signal generated by each speed sensor in response to the test signal is compared to the test signal. The speed sensors operate properly if each result signal comports with the test signal. Whatever the result of the comparison, local control means 230 sends a diagnostic message indicative of the state of each speed sensor to communication means 210. It is through communication means 210 that universal unit 100 can make the diagnostic message available to any other devices on brake control bus 10. The system may be configured so that either the MEU commands local control means 230 to check the operation of the speed sensors or that local control means 230 does so unilaterally.

Each truck axle is equipped with a speed sensor as is well known in the brake control art. The speed sensor interface means 240 receives input from these speed sensors and converts them into signals indicative of speed and the rate at which the rail vehicle is accelerating or decelerating. Speed sensor means 240 sends these speed and accel/decel signals to communication means 210 through which universal unit 100 can make them available to other devices on brake control bus 10 including the MEU and the brake assurance module 300 as discussed in greater detail below. The MEU may use the speed signal (e.g., in speed tapering) and the accel/decel signal (e.g., in jerk limiting) to calculate the final friction braking effort according to the Brake Control Process outlined in FIG. 4.

The transducer interface means performs tasks which can be performed according to principles well known in the brake control art. Specifically, transducer interface means 260 supplies power to each of the transducers in the universal unit such as the brake cylinder transducer (BCT) 460, the brake cylinder control transducer (BCCT) 470, and the air spring pressure transducer (AST) 450. The BCT supplies an electrical brake cylinder pressure feedback signal indicative of the pressure supplied to the brake cylinders of the truck. The BCCT supplies the electrical brake control pressure feedback signal indicative of the pressure applied to brake control port 654 of the VLRV. The ACT supplies the electrical air spring pressure signal indicative of the air spring pressure that it receives from the air suspension system. Transducer interface means 260 conditions these signals and sends one or more of them to brake assurance module 300 and to communication means 210. Through communication means 210, universal unit 100 can make these signals available to any of its components or to any other devices on brake control bus 10 including the MEU.

The solenoid driver means contains the solenoid driver circuits responsible for driving the emergency application valve (EAV), the service application valve (SAV) and the release valve (RV). These driver circuits receive the valve command signals from local control means 230 through which it drives these magnet valves. The valve command signals from local control means 230 are allowed to pass through brake assurance module 300 to solenoid driver means 250 during normal operating conditions. If the brakes do not apply during normal service or emergency braking, brake assurance module 300 will interrupt all communication between local control means 230 and solenoid driver means 250 so that only brake assurance module 300 can control the magnet valves as explained below.

During normal service or emergency braking, when solenoid driver means 250 receives a release valve command signal from local control means 230, it energizes (opens) the RV either continuously or pulsingly to reduce the pressure at brake control port 654 of VLRV 601. It also simultaneously directs the SAV to its normally closed (deenergized) state and the EAV remains commanded to its closed (energized) state. This prevents service brake control pressure or emergency brake control pressure from reaching brake control port 654. When solenoid driver means 250 receives a service valve command signal from local control means 230, it energizes (opens) the SAV either continuously or pulsingly to increase the pressure at brake control port 654. It also simultaneously directs the RV to its normally closed (deenergized) state and the EAV remains commanded to its closed (energized) state. This allows service brake control pressure to build at brake control port 654. When solenoid driver means 250 does not receive an emergency valve command signal from local control means 230, it deenergizes (opens) the EAV to increase the pressure at brake control port 654. It also simultaneously directs the RV to its normally closed (deenergized) state. This allows emergency brake control pressure to build at brake control port 654. Variable load relay valve 601 responds to each brake control pressure in the previously described manner.

The solenoid driver means also performs certain other tasks which can be performed according to principles well known in the brake control art. For example, feedback from the coils of each of the two-way valves may be supplied to solenoid driver means 250 and passed to communication means 210 of universal unit 100 as shown in FIG. 3. Universal unit 100 can make these valve feedback signals available to any of its components or to any other devices on brake control bus 10.

The valve feedback signals may be used by the overall system in any number of ways. They may, for example, be used for diagnostic purposes to determine whether any one or more of the magnet valves actually responded to the valve command signals issued by local control means 230. Specifically, from the valve feedback signals the MEU could determine whether the magnet valves correctly responded to the command for brake control pressure (i.e., brake force command signal) it sent to local control means 230. If the valve feedback signals do not comport with the brake force command signal issued by the MEU, the MEU can pass a diagnostic or status message indicative of valve malfunction or other failure to the central controller unit of the brake control system into which the present invention is incorporated. The central controller unit can, of course, be programmed to react in whatever manner the train authority deems appropriate. Through a visual or audio indication, for example, the brake control system can at a minimum inform the train operator of the exact nature of the problem.

Figure 5A:
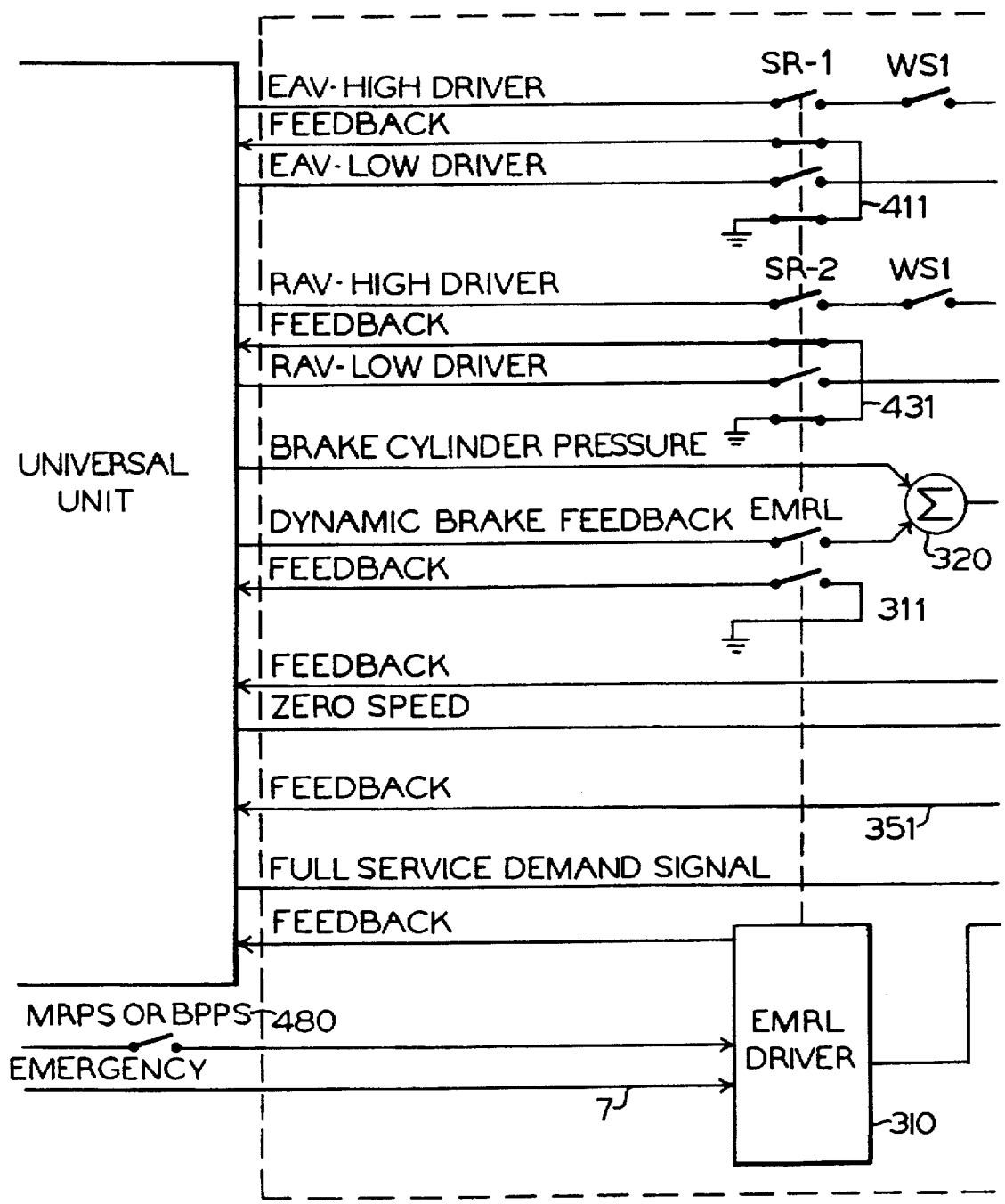
FIG. 5 is a schematic view of the brake assurance module connected within the universal brake control unit shown in FIGS. 2 and 3.
Figure 5B:
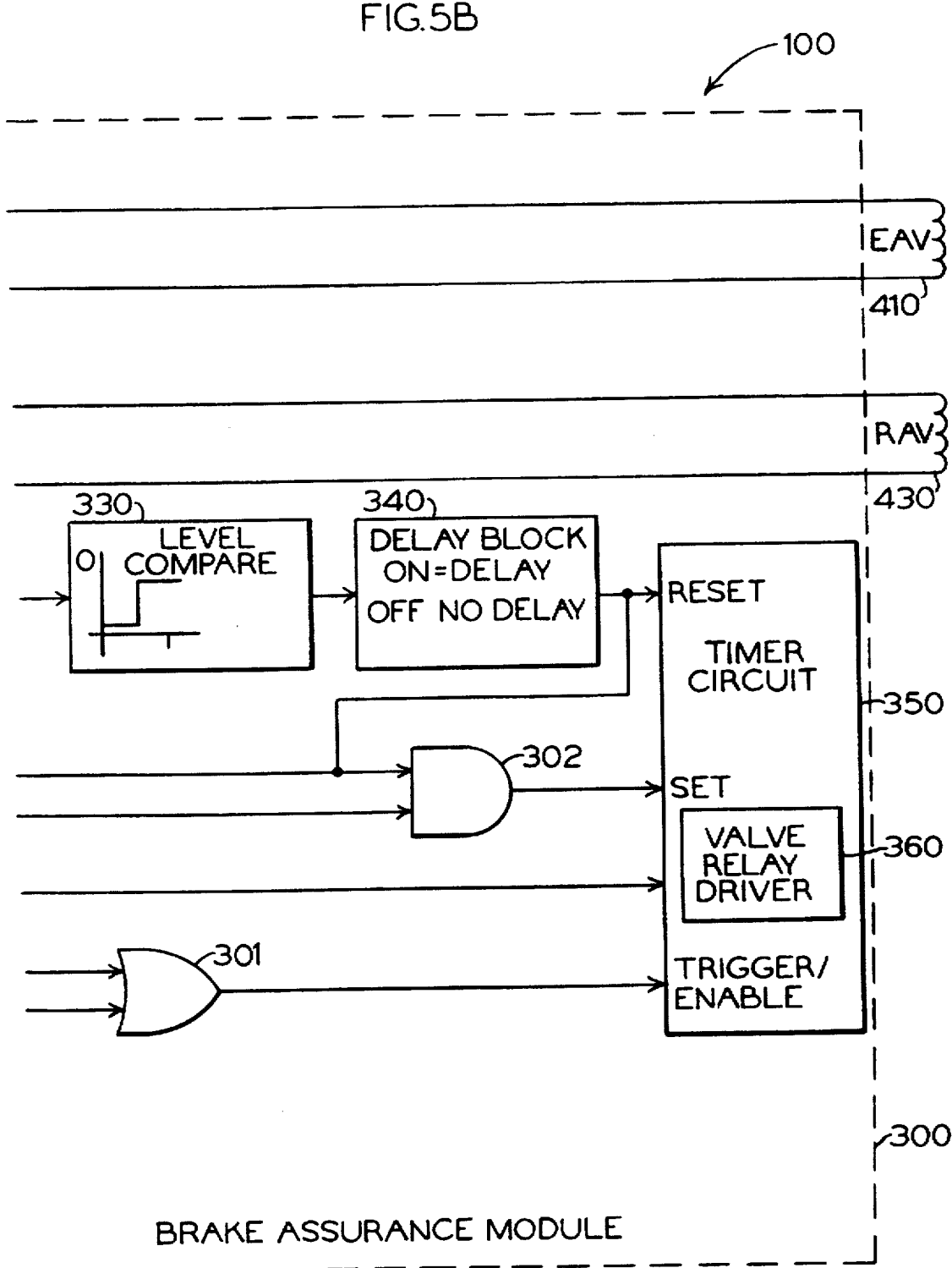

Referring now to FIG. 5, the brake assurance module includes logic OR and AND gates 301 and 302, an emergency relay (EMRL) driver 310, emergency (EMRL) contacts, a summing circuit 320, a level detector circuit 330, a delay circuit 340, a timer circuit 350, a valve relay driver 360 and normally open solenoid relay contacts SR1 and SR2. The primary inputs to brake assurance module 300 are the full service demand signal and the emergency signal. These signal are supplied by the brake control system into which the brake assurance module 300 is incorporated.

The full service demand signal merely represents a particular brake command signal (i.e., a particular rate request signal) through which the brake control system requests full application of the brakes. The full service demand signal may be routed from the brake control system via an electrical trainline either (1) to and through the MEU, brake control bus 10 and communication interface 210 into brake assurance module 300 (as in RT-5 T-1 Style and RT-5 MARTA Style) or (2) to and through communication interface 210 into brake assurance module 300 or (3) directly into brake assurance module 300. Similarly, the full service demand signal may be routed from the brake control system via a pneumatic trainline to a pressure transducer ultimately through the MEU, brake control bus 10, communication interface 210 and into brake assurance module 300. In the 26-C Brake Control System, for example, the central controller unit would send the full service demand signal pneumatically along brake pipe 3. The BPT 804 of BP sensing unit 800 would convert the pneumatic full service demand signal into an electrical signal which it passes to BP interface means 805. BP sensing unit 800 makes this electrical signal available to the MEU which passes it along brake control bus 10 to communication means 210 and ultimately into brake assurance module 300.

The EMRL driver 310 of brake assurance module 300 receives the emergency signal from the brake control system. Typically, the emergency signal is routed via (1) an electrical trainline 7 directly into brake assurance module 300 or (2) a pneumatic trainline into a pressure switch and then into the brake assurance module. In the 26-C Brake Control System, for example, the central controller unit would send the emergency signal pneumatically along brake pipe 3. When pressure in brake pipe 3 drops to an emergency level, the BPPS 480 of each universal unit 100 generates an electrical signal indicative of the emergency. The BPPS 480 then passes this emergency signal to brake assurance module 300. The EMRL driver 310 reduces the voltage level of the emergency signal so that it is made compatible with the logic circuitry of brake assurance module 300. EMRL driver 310 also feeds back this logic emergency detect signal to communication means 210 as is shown in FIGS. 3 and 5. Both the full service demand signal and the emergency signal are applied to the input of OR gate 301 whose output is fed into the trigger/enable input of timer circuit 350. The full service demand signal, of course, may or may not be used in this arrangement.

The summing circuit of the brake assurance module receives both the brake cylinder pressure feedback signal and the dynamic brake feedback signal. The brake cylinder feedback signal comes from the BCT 460 via transducer interface 260 and represents the actual friction braking effort of the brakes of the truck. The dynamic brake feedback signal ultimately comes from the propulsion unit(s) and represents the dynamic braking effort applied through the propulsion motors. The dynamic brake feedback signal is routed via an electrical trainline (1) through the MEU, brake control bus 10, communication interface 210 and into brake assurance module 300, (2) through communication interface 210 into brake assurance module 300, or (3) directly into brake assurance module 300. The output of summing circuit 320 is a signal representative of the total braking effort inclusive of both friction and dynamic braking effort.

The level detector circuit 330 receives the total braking effort signal from summing circuit 320. When the total braking effort exceeds a predetermined threshold, level detector circuit 330 outputs a threshold signal to delay circuit 340. If delay circuit 340 receives this threshold signal throughout a preset time period of preferably one second, delay circuit 340 passes a logic level signal to the reset input of timer circuit 350. Delay circuit 340 prevents short-lived noise or transients in either or both of the brake cylinder feedback signal and the dynamic brake feedback signal from inadvertently resetting the timer of timer circuit 350. The level signal output from delay circuit 340 indicates that the total braking effort has exceeded the predetermined threshold for the preset time period. The predetermined threshold is preferably set at the full service braking level or whatever other braking level is deemed appropriate depending on the type of brake control system into which the brake assurance module will be incorporated.

The AND gate 302 receives both the level signal output from delay circuit 340 and a zero speed signal. The zero speed signal may be routed from (1) an electrical trainline through the MEU, brake control bus 10, communication interface 210 into brake assurance module 300, (2) an electrical trainline through communication interface 210 into brake assurance module 300 or (3) speed sensor interface means 240 through local control means 230 into brake assurance module 300. The zero speed signal appears when the speed of the rail vehicle is approximately zero, i.e., typically below 3 mph. The output of AND gate 302 feeds into the set input of timer circuit 350.

The EMRL driver 310 controls the opening and closing of the EMRL contacts. One of the EMRL contacts is in series with a line that feeds the dynamic brake feedback signal to summing circuit 320, and another of the EMRL contacts is in series with an emergency status line 311 feeding into communication interface 210. Through this status line brake assurance module 300 can pass feedback concerning the state and condition of the EMRL contacts to communication means 210. Through communication interface 210, universal unit 100 can make this status signal available to the MEU or any other devices on brake control bus 10. When EMRL driver 310 activates in response to the emergency signal, the EMRL contacts open and the dynamic brake feedback signal is removed from the input of summing circuit 320. This assures that only the friction braking effort (and not the dynamic braking effort) will be considered by brake assurance module 300 during emergency braking.

The valve relay driver 360 controls the opening and closing of the SR1 and SR2 contacts. Two of the SR1 contacts are in series with the power and return control lines that feed the coil of the emergency application valve 410. Another two of the SR1 contacts are in series with a status line 411 feeding into communication means 210. Likewise, two of the SR2 contacts are in series with the power and return control lines that feed the coil of the release valve 430. Another two of the SR2 contacts are in series with a status line 431 feeding into communication means 210. Through these two solenoid status lines, brake assurance module 300 can pass feedback concerning the state of the valves as well as the state and condition of the SR1 and SR2 contacts to communication means 210. Through communication means 210, universal unit 100 can make these status signals available to the MEU or any other devices on brake control bus 10.

When there is no power applied to the brake assurance module or during an emergency, valve relay driver 360 is deactivated. This permits the SR1 and SR2 contacts to assume their normally open states, and assures that power is cut off to the coils of the emergency application and release valves 410 and 430. The emergency application valve 410 will be deenergized (opened) thereby allowing emergency brake control pressure to flow to brake control port 654 of variable load relay valve 601. The release valve 430 will also be deenergized (closed) thereby preventing pressure at brake control port 654 from venting to atmosphere. Variable load relay valve 601 responds by providing a pressure to the brake cylinders that is proportional to pressure that the variable load relay valve 601 receives from the air suspension system of the rail vehicle. This allows the VLRV 601 to compensate for the weight of the load borne by the rail vehicle during the emergency brake application.

When valve relay driver 360 is activated, however, it closes the SR1 and SR2 contacts thereby permitting power to flow through the SR1 and SR2 contacts to the coils of the two valves. Whether either one or both of the emergency application and release valves are actually energized, however, depends on how they are controlled by the MEU via communication means 210 and local control means 230. The MEU can control the SAV, RV and EAV magnet valves to allow brake control pressure to build or drop at brake control port 654 of variable load relay valve 601. During brake release operation, for example, the EAV would be energized (closed) thereby preventing emergency brake control pressure from flowing to brake control port 654. Simultaneously, the RV would also be energized (opened) thereby allowing pressure at brake control port 654 to vent to atmosphere. Similarly, during normal service braking operation, for example, the EAV would be energized (closed) while the service application and release valves would be controlled so as to allow service brake control pressure to build or drop at brake control port 654. Variable load relay valve 601 would then respond by providing to the brake cylinders the appropriate load compensated brake cylinder pressure through which it compensates for the load borne by the rail vehicle during service brake applications.

When power is first applied to brake assurance module 300, valve relay driver 360 will not activate until timer circuit 350 is set. Specifically, brake assurance module 300 monitors the lines through which it receives the zero speed signal and the level signal from delay circuit 340. When both of these signals appear simultaneously at the input of AND gate 302, this indicates that the speed of the rail vehicle is approximately zero and that the brake cylinder pressure exceeds the predetermined threshold (i.e., the brakes of the truck are applied), as would be expected upon start up of the train. This insures that pressure in the brake cylinders has built up before allowing a release of the brakes. Under these conditions, AND gate 302 feeds a logic set signal to the set input of timer circuit 350 and this sets the timer circuit. The timer circuit then activates valve relay driver 360 and puts brake assurance module 300 in a standby mode of operation.

During the standby mode of operation, brake assurance module 300 monitors the lines through which it receives the emergency and full service demand signals. Valve relay driver 360 during this standby mode is activated. The SR1 and SR2 contacts are therefore closed thereby permitting power to flow through the SR1 and SR2 contacts to the coils of the two valves. Whether either one or both of the emergency application and release valves are actually energized again depends on how they are controlled by the MEU via communication means 210 and local control means 230. The MEU can control the SAV, RV and EAV valves to allow brake control pressure to build or drop at brake control port 654. While brake assurance module 300 is in this standby mode, the valves can therefore be controlled so as to release the brakes or to provide normal service and/or emergency braking operation as described previously. Absent a loss of power or a response to an incoming full service demand signal or an emergency signal, the brake assurance module remains in this standby mode.

Meanwhile, the brake assurance module monitors the lines through which it receives the emergency and full service demand signals. When EMRL Driver 310 receives the emergency signal, it converts it into a logic emergency detect signal and also opens the EMRL contacts. This allows the dynamic brake feedback signal to be removed from summing circuit 320 during an emergency. It also allows the feedback concerning the state and condition of the EMRL contacts to be removed from communication means 210. If either the full service demand signal or the emergency detect signal appear at the input to OR gate 301, the OR gate feeds a logic enable signal into the trigger/enable input thereby enabling timer circuit 350. The timer of timer circuit 350 then starts to run.

While the timer is running, the brake control system should itself be building up pressure in the brake cylinders (via the universal units), assuming there are no malfunctions in the brake control system. This increase in brake cylinder pressure is evidenced by a corresponding change in the brake cylinder feedback signal. The increases in friction braking effort and in dynamic braking effort, if any, are passed to summing circuit 320 in the form of the brake cylinder pressure feedback and dynamic brake feedback signals, respectively. In response, summing circuit 320 outputs the total braking effort signal to level detector circuit 330. Once the total braking effort surpasses the predetermined threshold, level detector circuit 330 outputs the threshold signal to delay circuit 340. If delay circuit 340 receives this threshold signal throughout the preset time period, delay circuit 340 passes the level signal to the reset input of timer circuit 350.

If the reset input receives the level signal within a predetermined time period of preferably 3 to 5 seconds from the start of the timer, the timer circuit resets the timer and keeps brake assurance module 300 in the standby mode. The valve relay driver during this standby mode is continuously activated thereby keeping closed the SR1 and SR2 contacts and permitting power to be fed to the coils of the release and emergency application valves. Whether one or both of these two valves are actually energized, again depends on how the MEU controls the service application, emergency application and release valves as described previously. Whether the brake control system has responded to a command for emergency braking or one for service braking, brake assurance module 300 does not intervene. This is because the brake control system via the MEU and universal units (less the brake assurance module) has itself commanded the valves through which the appropriate brake control pressure is applied to brake control port 654. Variable load relay valve 601 then supplies the desired pressure to the brake cylinders thereby applying the brakes and resetting timer circuit 350 as well. Through a timer circuit status line 351, timer circuit 350 indicates whether the timer has reset or not.

Consider now what happens if there is a malfunction as result of which pressure does not build up pressure in the brake cylinders after the timer starts to run (i.e., after either the full service demand signal or the emergency detect signal have been received at the trigger input of timer circuit 350). If the level signal fails to appear at the reset input of timer circuit 350 within the predetermined time period, brake assurance module 300 is forced into an intervention mode. During the intervention mode, timer circuit 350 deactivates valve relay driver 360. This permits the SR1 and SR2 contacts to assume their normally open states, and assures that power is cut off to the coils of the release and emergency application valves 410 and 430. The emergency application valve will be deenergized (opened) thereby allowing emergency brake control pressure to flow to brake control port 654 of variable load relay valve 601. The release valve will also be deenergized (closed) thereby preventing pressure at brake control port 654 from venting to atmosphere. Variable load relay valve 601 then responds by providing to the brake cylinders the load compensated brake cylinder pressure through which it compensates for the load borne by the rail vehicle during this emergency brake application.

The brake assurance module thus operates in the intervention mode in response to a loss of power or in response to the predetermined set of conditions as set forth above. During the intervention mode, brake assurance module 300 itself essentially controls the valves through which emergency brake control pressure is supplied to brake control port 654 of the VLRV. This causes emergency pressure to be supplied to the brake cylinders and the brakes of the truck to apply. More specifically, when forced into the intervention mode, brake assurance module 300 interrupts the control that the MEU and local control means otherwise have or could have over the RV and EAV magnet valves during the standby mode. Though it no longer controls the RV and EAV valves, local control means 230 may still control the SAV 420. When brake assurance module 300 operates in the intervention mode, the state of service application valve 420 becomes unimportant.

Once brake assurance module 300 is placed into the intervention mode, it will not return to the standby mode and reactivate valve relay driver 360 until timer circuit 350 receives the set signal at its set input. This will occur when the total braking effort again exceeds the predetermined threshold for the preset time period and the speed of the rail vehicle again reduces to zero. When this occurs, AND gate 302 will feed the set signal to the set input and this sets timer circuit 350. With the timer circuit set, valve relay driver 360 reactivates and brake assurance module 300 again assumes the standby mode. During the standby mode, brake assurance module 300 again allows local control means 230 to control the RV and EAV valves according to the brake command signals it receives from the MEU. The magnet valves therefore assume whatever state to which they are commanded by local control means 230. The VLRV, of course, responds to whatever pressure it receives at its brake control port 654 and provides a corresponding pressure, if any, to the brake cylinders. Meanwhile, the brake assurance module again monitors the lines through which it receives the emergency and full service demand signals.

Certain authorities in the train industry require that wheel slip control be inhibited during emergency brake applications. Brake assurance module 300 may therefore include two wheel slip inhibit (WSI) contacts as shown in FIG. 5. One WSI contact is in series with the power line that feeds the coil of emergency application valve 410. The other WSI contact is in series with the power line that feeds the coil of release valve 430. Either the MEU or universal unit 100 may control the opening and closing of the WSI contacts as noted previously.

It is while the brake assurance module operates in the standby mode that the WSI contacts may come into play. Brake assurance module 300 keeps the SR1 and SR2 contacts closed during the standby mode as described previously. Similarly, the MEU can keep the WSI contacts closed to enable wheel slip control. With the SR1, SR2 and WSI contacts closed, the MEU via local control means 230 is able to order a service or an emergency brake application as described previously. During a service brake application, for example, local control means 230 commands SAV 420 to open (usually energize) and RV 430 to close (deenergize) so as to allow service brake control pressure to build at brake control port 654. Similarly, during an emergency brake application, local control 230 means commands the EAV to open (deenergize) and the RV to close (deenergize) so as to allow emergency brake control pressure to build at brake control port 654. The VLRV responds to each brake control pressure, of course, by providing a corresponding pressure to the brake cylinders that is proportional to pressure that the VLRV receives from the air suspension system.

Should wheel slip control be provided, the MEU via local control means 230 would at the very least briefly open (energize) release valve 430 during wheel slippage to reduce the pressure in the brake cylinders in the previously described manner. This would reduce the braking force being applied to the wheels of the truck to the point where the wheels are no longer sliding along the rails. When the wheels stop sliding, the MEU via the universal units would again bring the braking force up to the level requested by the brake control system via the brake command signal.

The wheel slip control function, however, may be inhibited during emergency braking by opening the WSI contacts in the brake assurance module. With the WSI contacts open, the EAV and RV will each assuredly be deenergized (open and closed, respectively). This, of course, allows emergency brake control pressure to continue to build at brake control port 654 of variable load relay valve 601. VLRV 601 responds accordingly by providing to the brake cylinders the corresponding load compensated brake cylinder pressure. The brakes respond by applying the emergency braking force to the wheels of the truck.

The WSI contacts come into play while brake assurance module 300 operates in the standby mode and the MEU via local control means 230 commands an emergency brake application. By opening the WSI contacts during these conditions, wheel slip control can be inhibited during emergency braking. It should be apparent that the wheel slip control may optionally be inhibited during service braking.

While the presently preferred embodiment and various related aspects of the instant invention have been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and useful arts, we secure for ourselves by Letters Patent exclusive rights to all subject matter embraced by the following claims for a time prescribed by the Patent Act.

We claim:

1. A brake assurance module for use with a brake control system for assuring application of the brakes of at least one truck of a rail vehicle, said brake assurance module comprising:

(a) a summing circuit for receiving a signal indicative of friction braking effort on a first feed line and a signal indicative of dynamic braking effort on a second feed line and for summing said friction and said dynamic braking effort signals into a total braking effort signal;

(b) a level detector circuit for generating a threshold signal when said total braking effort signal received from said summing circuit exceeds a predetermined threshold;

(c) a delay circuit which upon receiving said threshold signal from said level detector circuit throughout a preset time period generates a level signal;

(d) an emergency relay driver for controlling a first emergency contact in series within said second feed line such that upon receiving an emergency signal from said brake control system said emergency relay driver conveys an emergency detect signal and opens said first emergency contact thereby preventing said dynamic braking effort signal from being received by said summing circuit;

(e) a valve relay driver for controlling a first set of solenoid relay contacts each of which is in series within a control line used to energize a magnet valve whose operation is normally controlled by said brake control system, said valve relay driver when activated closes said solenoid contacts thereby permitting said brake control system to control said magnet valves and when deactivated opens said solenoid contacts thereby preventing said brake control system from controlling said magnet valves; and (f) a timer circuit having a set input, a trigger input and a reset input such that said timer circuit activates said valve relay driver upon said set input receiving an indication that both said level signal and a zero speed signal occur simultaneously thereby placing said brake assurance module in a standby mode of operation during which said timer circuit monitors said trigger input for said emergency detect signal in response to which said timer circuit becomes enabled such that if said timer circuit receives at said reset input said level signal within a predetermined time period then said timer circuit resets thereby keeping said brake assurance module in said standby mode else said timer circuit deactivates said valve relay driver thereby placing said brake assurance module in an intervention mode of operation.

2. The brake assurance module recited in claim 1 wherein said level signal generated by said delay circuit is also provided to said brake control system.

3. The brake assurance module recited in claim 1 wherein said emergency relay driver identically controls a second emergency contact in series within an emergency status line through which the state and condition of said emergency contacts can be provided to said brake control system.

4. The brake assurance module recited in claim 3 wherein said emergency relay driver upon receiving said emergency signal also provides said emergency detect signal to said brake control system.

5. The brake assurance module recited in claim 1 wherein said valve relay driver identically controls a second set of solenoid relay contacts each of which in series within a solenoid status line through which the state and condition of said first set of solenoid contacts and said magnet valves can be provided to said brake control system.

6. The brake assurance module recited in claim 1 wherein said timer circuit during said standby mode monitors said trigger input not only for said emergency detect signal but also for a full service demand signal in response to either or both of which said timer circuit becomes enabled.

7. The brake assurance module recited in claim 1 for controlling a set of wheel slip inhibit contacts each of which is in series within one of said control lines used to energize one of said magnet valves whose operation is normally controlled by said brake control system, said wheel slip inhibit contacts when closed enable wheel slip control and when opened inhibit said wheel slip control.

8. The brake assurance module recited in claim 7 wherein said wheel slip inhibit contacts are controlled so that said wheel slip control is inhibited only during emergency braking while said brake assurance module operates in said standby mode.

9. The brake assurance module recited in claim 1 wherein said timer circuit through a timer circuit status line provides to said brake control system the status of said timer circuit.

10. The brake assurance module recited in claim 1 wherein upon a loss of power said brake assurance module operates in said intervention mode.

11. A brake assurance module for use with a brake control system for assuring application of the brakes of at least one truck of a rail vehicle, said brake assurance module comprising:

(a) a summing circuit for receiving a signal indicative of friction braking effort on a first feed line and a signal indicative of dynamic braking effort on a second feed line and for summing said friction and said dynamic braking effort signals into a total braking effort signal;

(b) a level detector circuit for generating a threshold signal when said total braking effort signal received from said summing circuit exceeds a predetermined threshold;

(c) a delay circuit for generating a level signal upon receiving throughout a preset time period said threshold signal from said level detector circuit;

(d) an emergency relay driver for generating an emergency detect signal in response to an emergency signal received from said brake control system;

(e) a valve relay driver for controlling a first set of solenoid relay contacts each of which is in series within a control line used to energize a valve whose operation is normally controlled by said brake control system, said valve relay driver when activated closes said solenoid contacts thereby permitting said brake control system to control said valves and when deactivated opens said solenoid contacts thereby preventing said brake control system from controlling said valves; and (f) a timer circuit having a set input, a trigger input and a reset input such that said timer circuit activates said valve relay driver upon said set input receiving an indication that both said level signal and a zero speed signal occur simultaneously thereby placing said brake assurance module in a standby mode of operation during which said timer circuit monitors said trigger input for said emergency detect signal in response to which said timer circuit becomes enabled such that if said timer circuit receives at said reset input said level signal within a predetermined time period then said timer circuit resets thereby keeping said brake assurance module in said standby mode else said timer circuit deactivates said valve relay driver thereby placing said brake assurance module in an intervention mode of operation.

12. The brake assurance module recited in claim 11 wherein said level signal generated by said delay circuit is also provided to said brake control system.

13. The brake assurance module recited in claim 11 wherein said emergency relay driver controls a first emergency contact in series within said second feed line such that upon receiving said emergency signal said emergency relay driver opens said first emergency contact thereby preventing said dynamic braking effort signal from contributing to said total braking effort signal generated by said summing circuit.

14. The brake assurance module recited in claim 13 wherein said emergency relay driver identically controls a second emergency contact in series within an emergency status line through which the state and condition of said emergency contacts can be provided to said brake control system.

15. The brake assurance module recited in claim 14 wherein said emergency relay driver upon receiving said emergency signal also provides said emergency detect signal to said brake control system.

16. The brake assurance module recited in claim 11 wherein said valve relay driver identically controls a second set of solenoid relay contacts each of which in series within a solenoid status line through which the state and condition of said first set of solenoid contacts and said valves can be provided to said brake control system.

17. The brake assurance module recited in claim 11 wherein said timer circuit during said standby mode monitors said trigger input not only for said emergency detect signal but also for a full service demand signal in response to either or both of which said timer circuit becomes enabled.

18. The brake assurance module recited in claim 11 for controlling a set of wheel slip inhibit contacts each of which is in series within one of said control lines used to energize one of said valves whose operation is normally controlled by said brake control system, said wheel slip inhibit contacts when closed enable wheel slip control and when opened inhibit said wheel slip control.

19. The brake assurance module recited in claim 18 wherein said wheel slip inhibit contacts are controlled so that said wheel slip control is inhibited only during emergency braking while said brake assurance module operates in said standby mode.

20. The brake assurance module recited in claim 11 wherein said timer circuit through a timer circuit status line provides to said brake control system the status of said timer circuit.

21. The brake assurance module recited in claim 11 wherein upon a loss of power said brake assurance module operates in said intervention mode.

* * * * *